(12) United States Patent
Sakamaki et al.

(10) Patent No.: US 7,845,428 B2
(45) Date of Patent: Dec. 7, 2010

(54) ROTATING TOOL

(75) Inventors: Kazuo Sakamaki, Ojiya (JP); Akira Sakamaki, Ojiya (JP); Tadashi Taniguchi, Ojiya (JP); Kazuki Aoyagi, Ojiya (JP)

(73) Assignee: Yukiwa Seiko Kabushiki Kaisha, Niigata (JP)

( * ) Notice: Subject to any disclaimer, the term of this patent is extended or adjusted under 35 U.S.C. 154(b) by 400 days.

(21) Appl. No.: 11/915,919

(22) PCT Filed: May 19, 2006

(86) PCT No.: PCT/JP2006/310020

§ 371 (c)(1),
(2), (4) Date: Nov. 29, 2007

(87) PCT Pub. No.: WO2006/129500

PCT Pub. Date: Dec. 7, 2006

(65) Prior Publication Data

US 2009/0308629 A1      Dec. 17, 2009

(30) Foreign Application Priority Data

May 31, 2005   (JP)   ............................ 2005-160677
Apr. 12, 2006  (JP)   ............................ 2006-110095

(51) Int. Cl.
*E21B 3/00*      (2006.01)
*B23B 31/10*     (2006.01)
(52) U.S. Cl. .................. 173/164; 173/104; 279/77; 279/79; 279/137; 279/906
(58) Field of Classification Search .............. 173/104, 173/164, 176; 279/19.3, 22, 76, 79, 82, 77, 279/78, 137, 906
See application file for complete search history.

(56) References Cited

U.S. PATENT DOCUMENTS 1,341,934 A  *  6/1920  Schoenborn .................. 279/81
4,535,658 A  *  8/1985  Molinari .................. 81/177.85

(Continued)

FOREIGN PATENT DOCUMENTS

JP         51-121898 U       10/1976

(Continued)

*Primary Examiner*—Sameh H. Tawfik
*Assistant Examiner*—Gloria R. Weeks
(74) *Attorney, Agent, or Firm*—Sughrue Mion, PLLC

(57) ABSTRACT

An extremely useful rotating tool is provided that can prevent rattling caused by a clearance between a machine tool and a machine tool retaining hole while bringing the axial center position of the machine tool and the axial center position of the machine tool retaining hole as close together as possible. The present invention is a rotating tool having a rotating main shaft (4), and the rotating main shaft (4) is provided with a machine tool retaining hole (3) having a cross-sectional shape that substantially matches a base part (2) of a driver bit, drill bit, or other machine tool (1) having a polygonal cross-sectional shape that is inserted into the machine tool retaining hole (3), wherein the rotating tool rotates the machine tool (1) inserted in the machine tool retaining hole (3) by rotating the rotating main shaft (4) and performs work. A pushing mechanism is provided for rotating the machine tool (1) in a prescribed direction and twisting and pushing the machine tool (1) against an internal surface of the machine tool retaining hole (3).

20 Claims, 14 Drawing Sheets

U.S. PATENT DOCUMENTS

| | | | | |
|---|---|---|---|---|
| 4,603,998 A * | 8/1986 | Bober et al. | ............ | 403/322.2 |
| 4,692,073 A * | 9/1987 | Martindell | ............ | 408/239 A |
| 4,775,269 A * | 10/1988 | Brix | ............ | 408/239 R |
| 4,900,202 A * | 2/1990 | Wienhold | ............ | 408/240 |
| 5,013,194 A * | 5/1991 | Wienhold | ............ | 408/240 |
| 5,141,355 A * | 8/1992 | Stillwagon | ............ | 403/325 |
| 5,398,946 A * | 3/1995 | Quiring | ............ | 279/30 |
| 5,601,380 A * | 2/1997 | Guthrie et al. | ............ | 403/359.3 |
| 5,971,403 A * | 10/1999 | Yahagi et al. | ............ | 279/19.3 |
| 6,131,671 A * | 10/2000 | Shibata et al. | ............ | 173/48 |
| 6,199,872 B1 * | 3/2001 | Hasan | ............ | 279/30 |
| 6,269,888 B1 * | 8/2001 | Schuda et al. | ............ | 173/48 |
| 6,315,060 B1 * | 11/2001 | Schuda et al. | ............ | 173/132 |
| 6,349,948 B1 * | 2/2002 | Wu | ............ | 279/77 |
| 6,457,916 B2 * | 10/2002 | Wienhold | ............ | 408/240 |
| 6,499,908 B2 * | 12/2002 | Hauptmann et al. | ............ | 403/322.2 |
| 6,616,149 B1 * | 9/2003 | Pjevach et al. | ............ | 279/75 |
| 6,637,755 B2 * | 10/2003 | Chen et al. | ............ | 279/22 |
| 6,695,321 B2 * | 2/2004 | Bedi et al. | ............ | 279/22 |
| 6,929,266 B2 * | 8/2005 | Peters et al. | ............ | 279/82 |
| 2004/0104545 A1 * | 6/2004 | Chen | ............ | 279/81 |
| 2004/0232631 A1 * | 11/2004 | Chen et al. | ............ | 279/75 |
| 2008/0246233 A1 * | 10/2008 | Wienhold | ............ | 279/82 |

FOREIGN PATENT DOCUMENTS

| | | |
|---|---|---|
| JP | 59-19271 U | 2/1984 |
| JP | 10-193278 A | 7/1998 |
| JP | 2002-205281 A | 7/2002 |
| JP | 2002-210671 A | 7/2002 |
| JP | 2003-089071 A | 3/2003 |
| JP | 2004-154882 A | 6/2004 |

* cited by examiner

ROTATING TOOL

TECHNICAL FIELD

The present invention relates to a rotating tool.

BACKGROUND ART

In an impact driver, power driver, power drill, or other rotating tool that is provided with a rotating main shaft 43 having a machine tool retaining hole 42 into which a driver bit, drill bit, or other machine tool 41 such as the one shown in FIG. 1 is inserted, a clearance is conventionally provided between the machine tool retaining hole 42 and the machine tool 41 in order to insert various machine tools 41. In the drawing, the reference numeral 44 indicates a steel ball for securing the machine tool, 45 indicates a locking groove for locking the steel ball 44, 46 indicates a sliding tube for pushing the steel ball 44 into the machine tool 41, and 47 indicates a spring.

However, rattling occurs in the machine tool 41 as a matter of course when the clearance is present. Rattling of the machine tool 41 not only adversely affects working precision or efficiency, but also leads to damage and the like of the machine tool 41, and is undesirable.

Therefore, in order to eliminate this rattling, the external peripheral surface of the proximal end part of a machine tool 41 that is polygonal in cross-section may be pushed in the direction orthogonal to the axial direction of the machine tool 41 against the internal peripheral surface of a machine tool retaining hole 42 that substantially matches the cross-sectional shape of the proximal end part of the machine tool 41 to eliminate a prescribed portion of the clearance. However, when this method is used, the axial position A of the machine tool 41 is offset from the axial position B of the machine tool retaining hole 42, as shown in FIG. 2, run-out occurs in the machine tool 41, and satisfactory industrial work is impossible.

DISCLOSURE OF THE INVENTION

The present invention overcomes such drawbacks as those described above, and an object of the present invention is to provide a rotating tool having extreme practicality that is capable of preventing rattling without causing run-out of a machine tool.

The present invention will be briefly described with reference to the accompanying drawings.

A first aspect of the present invention is a rotating tool having a rotating main shaft 4 in which the rotating main shaft 4 is provided with a machine tool retaining hole 3 having a cross-sectional shape that substantially matches a base part 2 of a driver bit, drill bit, or other machine tool 1 having a polygonal cross-sectional shape that is inserted into the machine tool retaining hole 3, wherein the rotating tool rotates the machine tool 1 inserted in the machine tool retaining hole 3 by rotating the rotating main shaft 4 and performs work; the rotating tool characterized in that a pushing mechanism is provided for rotating the machine tool 1 in a prescribed direction in a state in which the machine tool 1 is inserted in the machine tool retaining hole 3, and twisting and pushing the machine tool 1 against an internal surface of the machine tool retaining hole 3.

The rotating tool according to the first aspect is also characterized in that a sliding tube 8 is provided to the machine tool retaining hole 3, and the sliding tube 8 allows the machine tool 1 to be mounted in the machine tool retaining hole 3, the pushing mechanism to be operated so as to twist and push the machine tool 1 against the internal surface of the machine tool retaining hole 3 through sliding of the sliding tube 8.

The rotating tool according to the second aspect is characterized in that the sliding of the sliding tube 8 is a single sliding movement of the sliding tube 8.

The rotating tool according to the first aspect is also characterized in that a sliding tube 8 is provided to the machine tool retaining hole 3, and the sliding tube 8 is configured so that the machine tool 1 is retained in the machine tool retaining hole 3, the pushing mechanism is operated, the machine tool 1 is rotated in a prescribed direction, and retaining of the machine tool 1 and twisting and pushing of the machine tool 1 against the internal surface of the machine tool retaining hole 3 are accomplished when the sliding tube 8 is slid, the machine tool 1 is inserted into the machine tool retaining hole 3, and the sliding tube 8 is moved back.

The rotating tool according to the first aspect is also characterized in that a locking groove 5 is provided to a base part 2 of the machine tool 1, and a locking body 6 for locking in the locking groove 5 is provided to the machine tool retaining hole 3.

The rotating tool according to a fifth aspect is characterized in that the locking body 6 is disposed in the locking groove 5, and the machine tool 1 is rotated in a prescribed direction by the pushing mechanism.

The rotating tool according to any of the first through sixth aspects is characterized in that the pushing mechanism is configured so as to twist and push the machine tool 1 against the internal surface of the machine tool retaining hole 3 when an operation is performed for attaching the machine tool 1, or release the twisting and pushing when an operation is performed for attaching or detaching the machine tool 1.

The rotating tool according to a seventh aspect is characterized in that a sliding tube 8 that is urged toward a proximal end or toward a distal end is fitted to a distal end part of the machine tool retaining hole 3; and the pushing mechanism is configured so that the twisting and pushing of the machine tool 1 against the internal surface of the machine tool retaining hole 3 is released by pulling of the sliding tube 8 to the distal end or the proximal end against an urging force, and the machine tool 1 is twisted and pushed against the internal surface of the machine tool retaining hole 3 by a reciprocating movement of the sliding tube 8 towards an opposite side by the urging force.

The rotating tool according to an eighth aspect is characterized in that the locking body 6 is placed in the locking groove 5 when the machine tool 1 is twisted and pushed against the internal surface of the machine tool retaining hole 3.

The rotating tool according to a ninth aspect is characterized in that a peripheral wall of the machine tool retaining hole 3 is provided with a protruding/retreating body 7 for protruding from and retreating into the peripheral wall; the protruding/retreating body 7 is pushed by a base part 2 of the machine tool 1 inserted in the machine tool retaining hole 3, and can retreat into the peripheral wall of the machine tool retaining hole 3 in a state in which the sliding tube 8 is pulled against an urging force towards a distal end or a proximal end; and the protruding/retreating body 7 protrudes from the peripheral wall of the machine tool retaining hole 3, and twists and pushes a base part 2 of the machine tool 1 against the internal surface of the machine tool retaining hole 3 in a state in which the sliding tube 8 is moved back by the urging force towards the opposite side.

The rotating tool according to a tenth aspect is characterized in that the protruding/retreating body 7 is provided in a position facing a peripheral wall of the machine tool retaining hole 3.

The rotating tool according to the tenth aspect is also characterized in that the protruding/retreating body 7 is a spherical body.

The rotating tool according to an eleventh aspect is characterized in that the protruding/retreating body 7 is a spherical body.

The rotating tool according to the first aspect is also characterized in that a rotating body 10 in which an insertion passage hole 9 communicated with the machine tool retaining hole 3 is formed is provided to a distal end part of the machine tool retaining hole 3, and the rotating body 10 is provided with a rotational urging mechanism for rotating the insertion passage hole 9 and a machine tool 1 inserted in the machine tool retaining hole 3 in a prescribed direction, and twisting and pushing the machine tool 1 against the internal surface of the machine tool retaining hole 3.

The rotating tool according to a fourteenth aspect is characterized in that the insertion passage hole 9 is provided so as to be offset a prescribed angle in relation to the machine tool retaining hole 3 as viewed from the front, and the insertion passage hole 9 is moved back by a rotational urging force when the insertion passage hole 9 is rotated to conform to the machine tool retaining hole 3.

The rotating tool according to the fourteenth aspect is also characterized in that a sliding tube 8 that is urged toward a proximal end or toward a distal end is fitted to a distal end part of the machine tool retaining hole 3; and the rotational urging mechanism is configured so that the machine tool 1 is not rotationally urged in a prescribed direction in a state in which the sliding tube 8 is pulled to the distal end or the proximal end against an urging force, and the machine tool 1 is rotated in the prescribed direction and twisted and pushed against the internal surface of the machine tool retaining hole 3 in a state in which the sliding tube 8 is moved back towards an opposite side by the urging force.

The rotating tool according to any of the fourteenth through sixteenth aspects is characterized in that a locking groove 5 is provided to a base part 2 of the machine tool 1, and a locking body 6 for locking in the locking groove 5 is provided to the machine tool retaining hole 3.

The rotating tool according to a seventeenth aspect is characterized in that the locking body 6 is disposed in the locking groove 5, and the machine tool 1 is rotated in a prescribed direction by the rotational urging mechanism.

The present invention is also a rotating tool for rotating a machine tool 1 inserted in a machine tool retaining hole 3 and performing work by rotating a rotating main shaft 4, wherein the rotating tool has a rotating main shaft 4; a driver bit, drill bit, or other machine tool 1 is inserted in the rotating main shaft 4; and a machine tool retaining hole 3 having a cross-sectional shape that substantially matches a polygonal cross-sectional-shaped base part 2 of the machine tool is provided; the rotating tool characterized in that a pushing mechanism for pushing in a state facing the vicinity of an angled part of the machine tool 1 inserted in the machine tool retaining hole 3 is provided to the rotating main shaft 4; the pushing mechanism is configured so as to push in a state facing the vicinity of the angled part of the machine tool and rotate the machine tool, and twist and push the machine tool against an internal surface of the machine tool retaining hole 3; a locking groove 5 is provided to the base part 2 of the machine tool; locking bodies 6 for locking in the locking groove 5 and retaining the machine tool are provided to the machine tool retaining hole 3; a sliding tube 8 that is urged towards a proximal end or a distal end is provided to the machine tool retaining hole 3; retention of the machine tool by the locking bodies 6 is released, and twisting and pushing of the machine tool against the internal surface of the machine tool retaining hole 3 by the pushing mechanism is released when the sliding tube 8 is pulled towards the distal end or the proximal end against an urging force; and the locking bodies 6 are placed in the locking groove 5, the machine tool is retained, and the machine tool is twisted and pushed against the internal surface of the machine tool retaining hole 3 by the pushing mechanism when the sliding tube 8 is moved back towards an opposite side by the urging force.

The present invention is also a rotating tool for rotating a machine tool 1 inserted in a machine tool retaining hole 3 and performing work by rotating a rotating main shaft 4, wherein the rotating tool has a rotating main shaft 4; a driver bit, drill bit, or other machine tool 1 is inserted in the rotating main shaft 4; and a machine tool retaining hole 3 having a cross-sectional shape that substantially matches a polygonal cross-sectional-shaped base part 2 of the machine tool is provided; the rotating tool characterized in that a pushing mechanism for pushing in a state facing the vicinity of an angled part of the machine tool 1 inserted in the machine tool retaining hole 3 is provided to the rotating main shaft 4; the pushing mechanism is configured so as to push in a state facing the vicinity of the angled part of the machine tool and rotate the machine tool, and twist and push the machine tool against an internal surface of the machine tool retaining hole 3; a locking groove 5 is provided to the base part 2 of the machine tool; locking bodies 6 for locking in the locking groove 5 and retaining the machine tool are provided to the machine tool retaining hole 3; a sliding tube 8 that is urged towards a proximal end or a distal end is provided to the machine tool retaining hole 3; twisting and pushing of the machine tool against the internal surface of the machine tool retaining hole 3 by the pushing mechanism is released when the sliding tube 8 is pulled towards the distal end or the proximal end against an urging force; and the machine tool is twisted and pushed against the internal surface of the machine tool retaining hole 3 by the pushing mechanism when the sliding tube 8 is moved back towards an opposite side by the urging force.

The present invention is configured as described above, and is therefore an extremely useful rotating tool that can prevent rattling caused by a clearance between a machine tool and a machine tool retaining hole while bringing the axial center position of the machine tool and the axial center position of the machine tool retaining hole as close together as possible.

BEST MODE FOR CARRYING OUT THE INVENTION

Preferred embodiments of the present invention are briefly described below with reference to the diagrams while indicating the effects of the present invention.

A driver bit or other machine tool 1 is inserted into the machine tool retaining hole 3 of the rotating main shaft 4, and work is performed using the machine tool 1.

At this time, the machine tool 1 can be rotated in a prescribed direction by a pushing mechanism, and the machine tool 1 can be twisted and pushed against the internal surface of the machine tool retaining hole 3.

Consequently, rattling of the machine tool 1 is, of course, inhibited by the twisting and pushing against the internal surface of the machine tool retaining hole 3, the axial center position of the machine tool 1 and the axial center position of the machine tool retaining hole 3 are brought as close together as possible, and run-out of the machine tool 1 is prevented.

Work can thus be performed satisfactorily using the machine tool 1.

Example 1

Example 1 of the present invention will be described based on FIGS. 3 through 7.

Example 1 is a rotating tool having a rotating main shaft 4 in which the rotating main shaft 4 is provided with a machine tool retaining hole 3 having a cross-sectional shape that substantially matches a base part 2 of a driver bit, drill bit, or other machine tool 1 having a polygonal cross-sectional shape that is inserted into the machine tool retaining hole 3, wherein the rotating tool rotates the machine tool 1 inserted in the machine tool retaining hole 3 by rotating the rotating main shaft 4 and performs work. The rotating tool is provided with a pushing mechanism for rotating the machine tool 1 in a prescribed direction in a state in which the machine tool 1 is inserted in the machine tool retaining hole 3, and twisting and pushing the machine tool 1 against an internal surface of the machine tool retaining hole 3.

Figure 1:
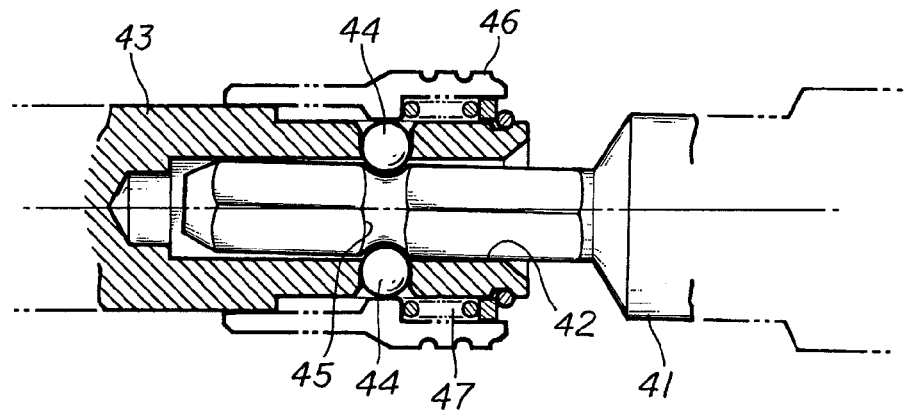
FIG. 1 is a schematic sectional view showing the conventional example.
Figure 2:
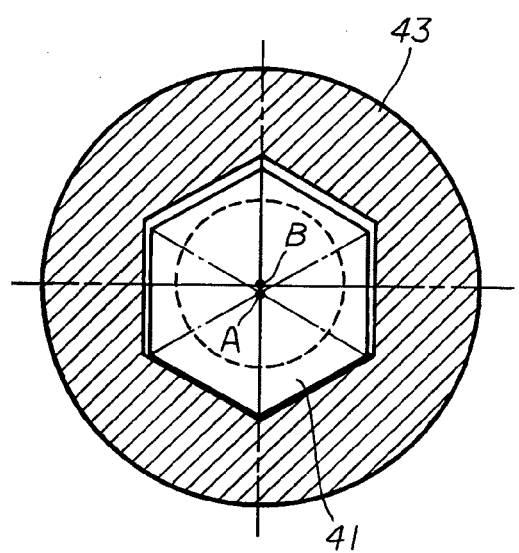
FIG. 2 is a sectional view showing the conventional example.
Figure 3:
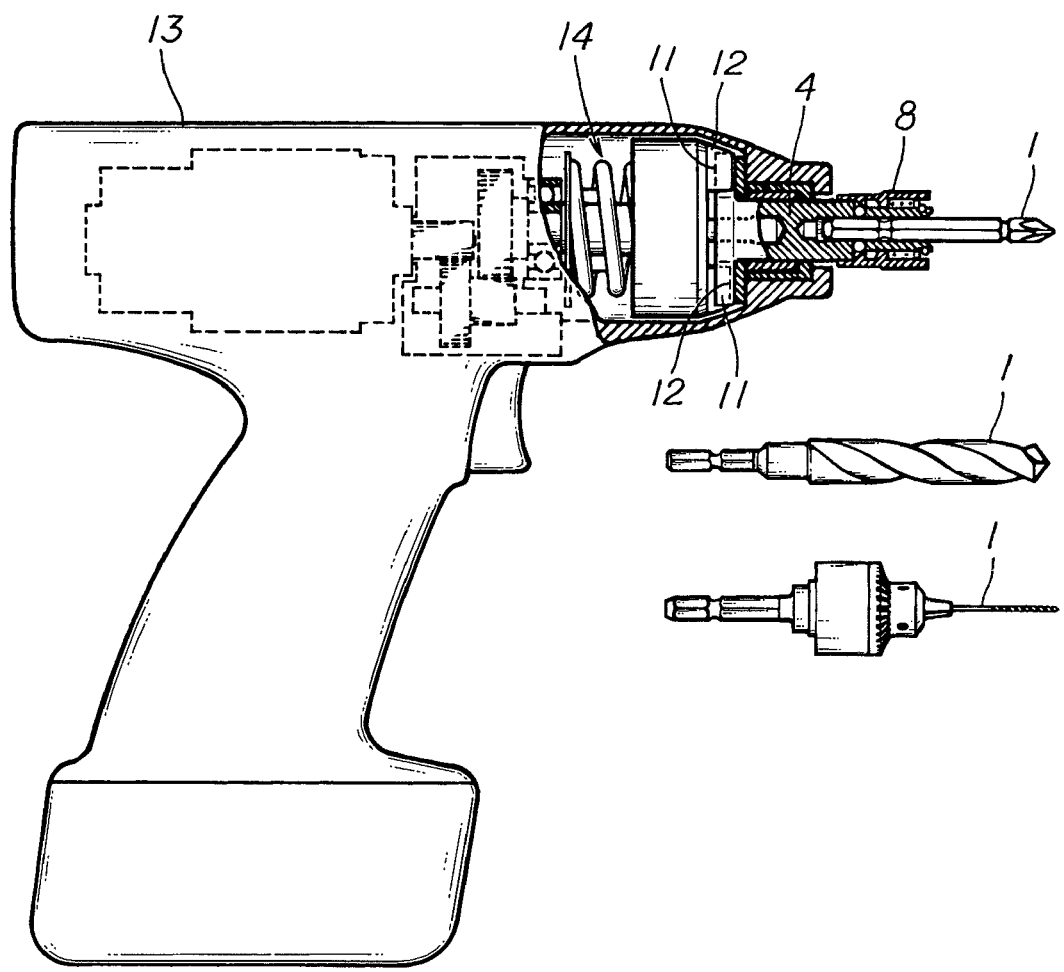
FIG. 3 is a schematic sectional view showing Example 1.

As shown in FIG. 3, Example 1 is an example in which the present invention is applied to a so-called impact driver 13 in which a pair of anvils 11 that protrude in the direction orthogonal to the axial center direction of the rotating main shaft 4 is provided to the proximal end of the rotating main shaft 4, hammers 12 are also provided in which a tapered striking surface strikes forward while applying a rotational force to the pair of anvils 11, and the anvils 11 are struck by the hammers 12, whereby a forward impact is applied while the machine tool 1 (rotating main shaft 4) is rotated, and work is performed. The reference numeral 14 in the drawing indicates a drive mechanism for driving the hammers. The present invention is not limited to an impact driver, and may also be applied to another power driver, power drill, or the like.

Each component will be specifically described.

A locking groove 5 is provided to the base part 2 of the machine tool 1, and locking bodies 6 for locking in the locking groove 5 are provided to the machine tool retaining hole 3.

Specifically, a locking groove 5 having the shape of a semi arc as viewed in cross-section into which steel balls as the locking bodies 6 are locked is provided to the base part 2 of the machine tool 1, and a first tapered hole 15 into which the steel ball freely fits and expands to the outside is provided to the distal end part of the peripheral wall of the machine tool retaining hole 3. The inside open part of the first tapered hole 15 has a diameter whereby the steel ball protrudes and fits into the locking groove 5 without separating. The first tapered hole 15 is provided in a position facing the peripheral wall of the machine tool retaining hole 3.

The steel balls as the locking bodies 6 are pushed by a first pushing part 17 provided to a sliding tube 8 described hereinafter.

The pushing mechanism is provided to the peripheral wall of the machine tool retaining hole 3, and is composed of protruding/retreating bodies 7 (steel balls), and a second pushing part 18 that is provided to the sliding tube 8 described hereinafter.

Figure 7:
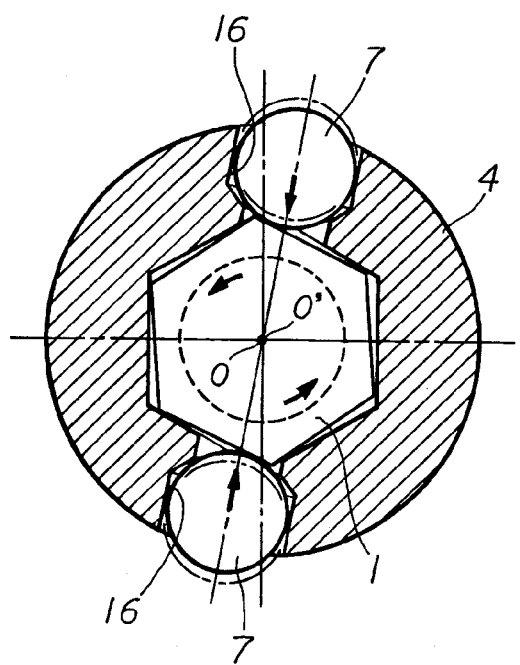
FIG. 7 is a schematic sectional view showing Example 1.

Specifically, as shown in FIG. 7, the protruding/retreating bodies 7 are steel balls, and a second tapered hole 16 in which the steel balls as the protruding/retreating bodies 7 are freely fitted is provided in an opposing position further towards the proximal end of the machine tool retaining hole 3 than the first tapered hole 15 in which the locking bodies 6 are freely fitted in the peripheral wall.

The second tapered hole 16 has a structure in which the large-diameter part connects to the small-diameter part at which the angled part of the machine tool 1 inserted in the machine tool retaining hole 3 is positioned, and is configured so that the opposite sides of the steel balls push in the vicinity of the angled part of the machine tool 1, and the machine tool 1 is twisted (rotated) when the steel balls positioned in the large-diameter part are pushed by the second pushing part 18 of the sliding tube 8.

A configuration is adopted in Example 1 in which the protruding/retreating bodies 7 are provided in opposing positions in the peripheral wall of the machine tool retaining hole 3, but the pair of protruding/retreating bodies 7 may be provided in non-opposing positions, three protruding/retreating bodies 7 may be provided at equal intervals, a single protruding/retreating body 7 may be provided (this configuration is not preferred), or another configuration may be adopted insofar as the machine tool 1 can be rotated in a prescribed direction and twisted and pushed against the internal surface of the machine tool retaining hole 3. A configuration may also be adopted in which a plurality of pushing mechanisms is provided in the length direction (length direction of the machine tool retaining hole 3) of the machine tool 1.

Example 1 is configured so that the locking bodies 6 are placed in the locking groove 5 when the machine tool 1 is twisted and pushed against the internal surface of the machine tool retaining hole 3. Specifically, a configuration is adopted whereby the machine tool 1 is inserted in the machine tool retaining hole 3, and placing of the locking bodies 6 in the locking groove 5 occurs simultaneously with rotation of the machine tool 1 in the prescribed direction by the pushing mechanism.

Figure 5:
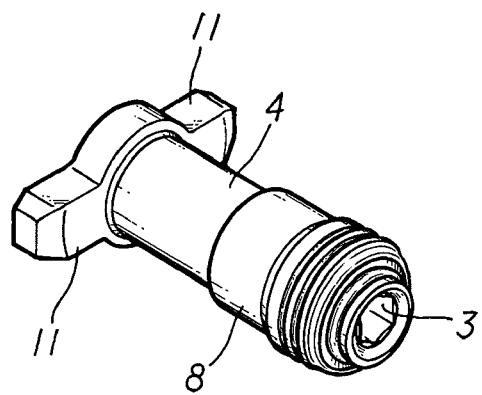
FIG. 5 is a schematic perspective view showing the relevant parts of Example 1.
Figure 6:
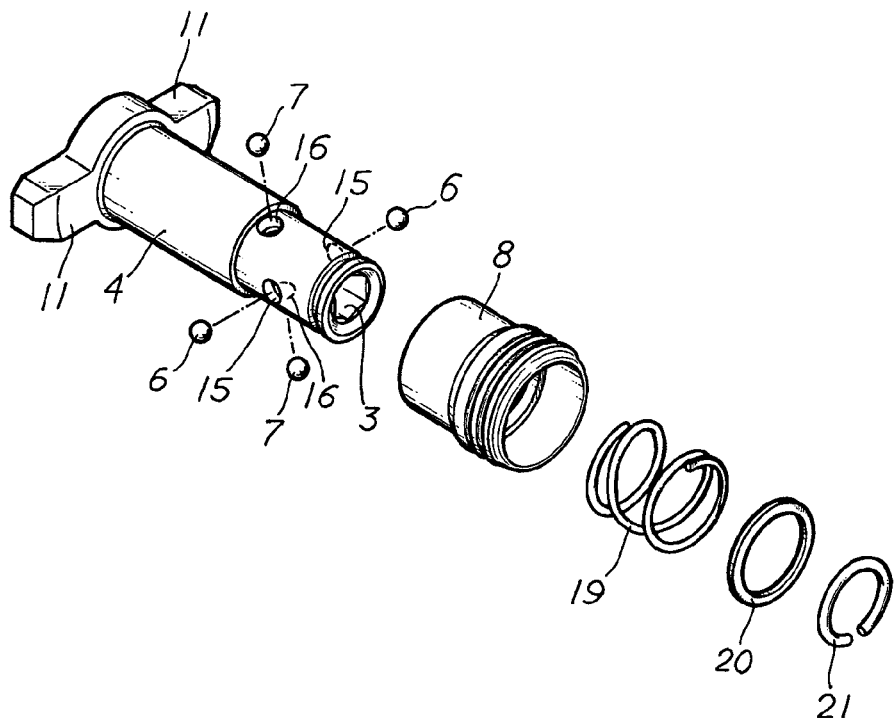
FIG. 6 is a schematic exploded perspective view showing the relevant parts of Example 1.

Specifically, the sliding tube 8 urged towards the proximal end is fitted in the distal end part of the machine tool retaining hole 3 as shown in FIGS. 5 and 6. The sliding tube 8 is urged towards the proximal end by a spring 19 that is held by a washer 20 and the first pushing part 17 described hereinafter between the internal peripheral surface of the sliding tube 8 and the peripheral wall of the machine tool retaining hole 3. The reference numeral 21 in the drawing is a ring for supporting the washer 20 and preventing loss of the spring 19. The sliding tube 8 may also be configured so as to be urged towards the distal end.

The sliding tube 8 is configured so that when the locking bodies 6 and the protruding/retreating bodies 7 are pushed by the base part 2 of the machine tool 1 inserted in the machine tool retaining hole 3 in a state in which the sliding tube 8 is pulled towards the distal end against the urging force of the spring 19, the locking bodies 6 and the protruding/retreating bodies 7 retreat into the peripheral wall of the machine tool retaining hole 3, the locking bodies 6 are positioned between the first pushing part 17 and the second pushing part 18, and the protruding/retreating bodies 7 are positioned towards the proximal end of the second pushing part 18. The sliding tube 8 is also configured so that the locking bodies 6 and the protruding/retreating bodies 7 protrude from the peripheral wall of the machine tool retaining hole 3 in a state in which the sliding tube 8 is urged towards the proximal end.

Figure 4:
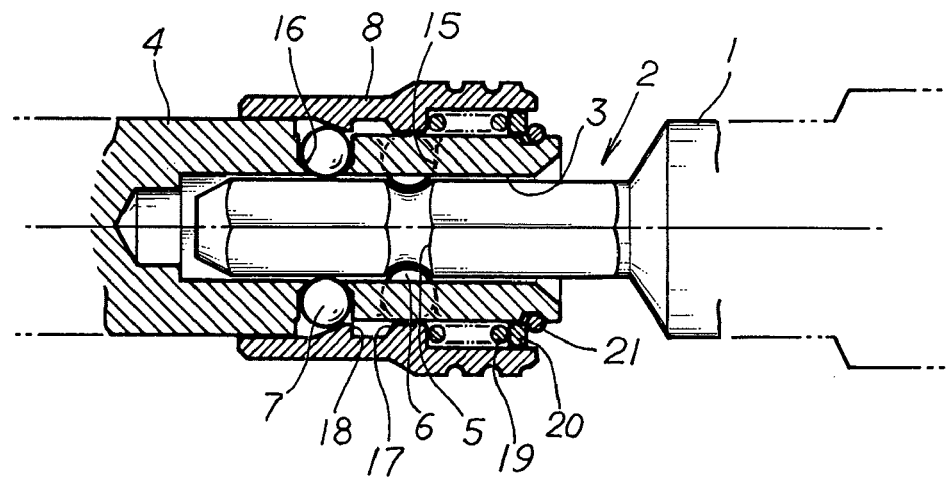
FIG. 4 is a schematic sectional view showing Example 1.

Specifically, the first pushing part 17 for preventing the retreat of the locking bodies 6 and pushing the locking bodies 6 out towards the machine tool 1 from the first tapered hole 15, and the second pushing part 18 for preventing the retreat of the protruding/retreating bodies 7 and pushing the protruding/retreating bodies 7 out towards the machine tool 1 from the second tapered hole 16 are provided in protruding fashion to the internal peripheral surface of the sliding tube 8, as shown in FIG. 4.

The distal-end side surface of the first pushing part 17 is configured as a supporting surface for supporting one side of the spring 19.

The first pushing part 17 and the second pushing part 18 push the locking bodies 6 and protruding/retreating bodies 7 of the first tapered hole 15 and the second tapered hole 16 into which the locking bodies 6 and protruding/retreating bodies 7 are freely fitted out into the machine tool retaining hole 3 in a state in which the sliding tube 8 is urged towards the proximal end of the rotating main shaft 4, and the locking bodies 6 and protruding/retreating bodies 7 therefore allowed to retreat into the first tapered hole 15 and the second tapered hole 16 in a state in which the sliding tube 8 is pulled against the urging force towards the distal end of the rotating main shaft 4.

Accordingly, when the base part 2 of the machine tool 1 is inserted in the machine tool retaining hole 3, the sliding tube 8 is pulled against the urging force towards the distal end of the rotating main shaft 4, the steel balls are allowed to retreat in conjunction with the insertion of the machine tool 1, and the base part 2 of the machine tool 1 is placed inside the machine tool retaining hole 3, after which pulling of the sliding tube 8 is stopped, and the sliding tube 8 is urged towards the proximal end (moved back by the urging force in the opposite direction), whereby the steel balls are caused to protrude inward, the base part 2 of the machine tool 1 is locked by the locking bodies 6, and the base part 2 of the machine tool 1 can be rotated in the prescribed direction by the protruding/retreating bodies 7. Retention (installation) of the machine tool 1 in the machine tool retaining hole 3, and twisting and pushing of the machine tool 1 against the internal surface of the machine tool retaining hole 3 can both be performed through the extremely simple sliding operation, i.e., a single sliding motion (a single pull and the return movement that accompanies the pull), of the sliding tube 8.

The steel balls as the locking bodies 6 lock into the locking groove 5 formed in the base part 2 of the machine tool 1, and prevent the machine tool 1 from pulling out, and the steel balls as the protruding/retreating bodies 7 twist and push the machine tool 1 against the internal surface of the machine tool retaining hole 3.

In Example 1, the base part 2 of the machine tool 1 is thus twisted and pushed against the internal surface of the machine tool retaining hole 3 by the protruding/retreating bodies 7, the machine tool 1 is held between the protruding/retreating bodies 7 and the internal surface of the machine tool retaining hole 3, and rattling of the machine tool 1 can be prevented at the same time as the machine tool 1 is being retained in the machine tool retaining hole 3 as in the conventional technique.

Since rattling of the machine tool 1 can be prevented by rotating the machine tool 1 in the prescribed direction, misalignment of the axial center position A of the machine tool 41 with the axial center position B of the machine tool retaining hole 42 such as in the conventional technique can be prevented as fully as possible.

In particular, the base part 2 of the machine tool 1, which is hexagonal as viewed in cross-section, is twisted and pushed against the internal surface of the machine tool retaining hole 3 having substantially the same cross-sectional shape as the base part by the pair of equally protruding protruding/retreating bodies 7 in the manner described above in Example 1. Therefore, the machine tool 1 having a hexagonal cross-sectional shape rotates and slides along the opposing internal surface of the machine tool retaining hole 3, the axial center position O of the machine tool 1 is positioned so as to coincide with the axial center position O' of the machine tool retaining hole 3 as much as possible within the machine tool retaining hole 3, the axial center positions of the machine tool 1 and the machine tool retaining hole 3 are brought as close together as possible, and run-out of the machine tool 1 during work is thus inhibited.

In Example 1, the second tapered hole 16 is provided as shown in FIG. 7 so that the protruding/retreating bodies 7 freely fitted in the second tapered hole 16 are positioned near the right side of the angled part of the machine tool 1.

Consequently, when the rotating main shaft 4 is rotated to the right (rotated in the screw-tightening direction), the angled part of the machine tool 1 that is held between the protruding/retreating bodies 7 and the internal surface of the machine tool retaining hole 3 is strongly pushed against the internal surface of the machine tool retaining hole 3, and when the rotating main shaft 4 is rotated to the left (rotated in the screw-loosening direction), the external peripheral surface of the machine tool 1 that comes in contact with the protruding/retreating bodies 7 is strongly pushed by the protruding/retreating bodies 7.

Steel balls (spherical bodies) are used as the locking bodies 6 and the protruding/retreating bodies 7 in Example 1, but pin bodies or bodies having another shape may also be used.

Because Example 1 has the configuration described above, the machine tool 1 is rotated in the prescribed direction by the pushing mechanism, and the machine tool 1 can be twisted and pushed against the internal surface of the machine tool retaining hole 3 when the driver bit or other machine tool 1 is inserted in the machine tool retaining hole 3 of the rotating main shaft 4, and work is performed by the machine tool 1. Consequently, rattling of the machine tool 1 is, of course, inhibited by the twisting and pushing against the internal surface of the machine tool retaining hole 3, the axial center position of the machine tool 1 and the axial center position of the machine tool retaining hole 3 are brought as close together as possible, and run-out of the machine tool 1 is prevented. Work can thus be performed satisfactorily using the machine tool 1.

The machine tool 1 can be retained and also prevented from rattling at the same time, merely by pulling the sliding tube 8 towards the distal end and inserting the machine tool 1 in the machine tool retaining hole 3, and productivity is not compromised.

Since the same steel balls as those of the locking bodies 6 are used for the protruding/retreating bodies 7, the present invention can be manufactured at a correspondingly lower cost.

Example 1 is therefore an extremely useful rotating tool that can prevent rattling caused by a clearance between a machine tool and a machine tool retaining hole while bringing the axial center position of the machine tool and the axial center position of the machine tool retaining hole as close together as possible.

Example 2

Example 2 of the present invention will be described based on FIGS. 8 through 16.

Figure 8:
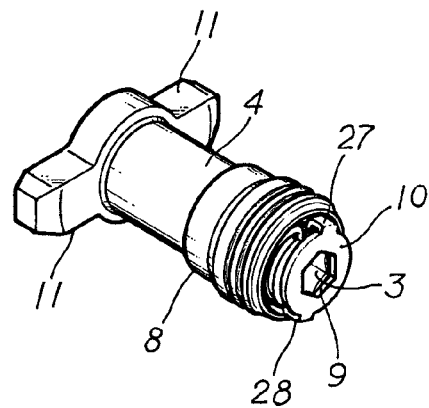
FIG. 8 is a schematic perspective view showing Example 2.
Figure 9:
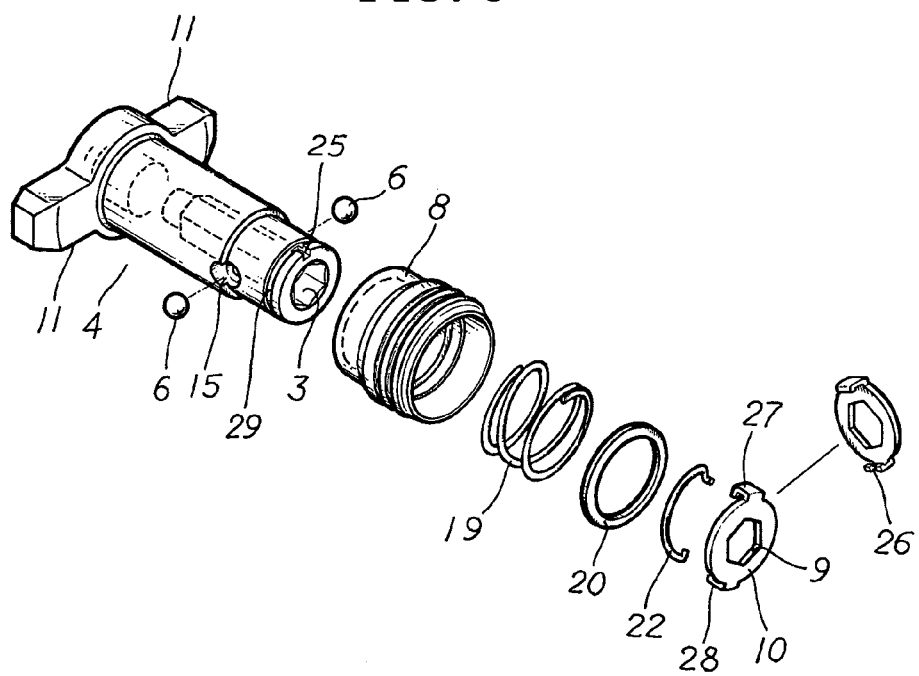
FIG. 9 is a schematic exploded perspective view showing Example 2.

Instead of the pushing mechanism of Example 1, a configuration is adopted in Example 2 in which a rotating body 10 in which an insertion passage hole 9 communicated with the machine tool retaining hole 3 is provided to the distal end part of a machine tool retaining hole 3 such as the one shown in FIGS. 8 and 9, and the rotating body 10 is provided with a rotational urging mechanism for rotating the insertion passage hole 9 and a machine tool 1 inserted in the machine tool retaining hole 3 in a prescribed direction.

The sliding tube 8 urged towards the proximal end is fitted to the distal end part of the machine tool retaining hole 3, and the rotational urging mechanism is provided between the machine tool retaining hole 3 and the sliding tube 8.

Figure 16:
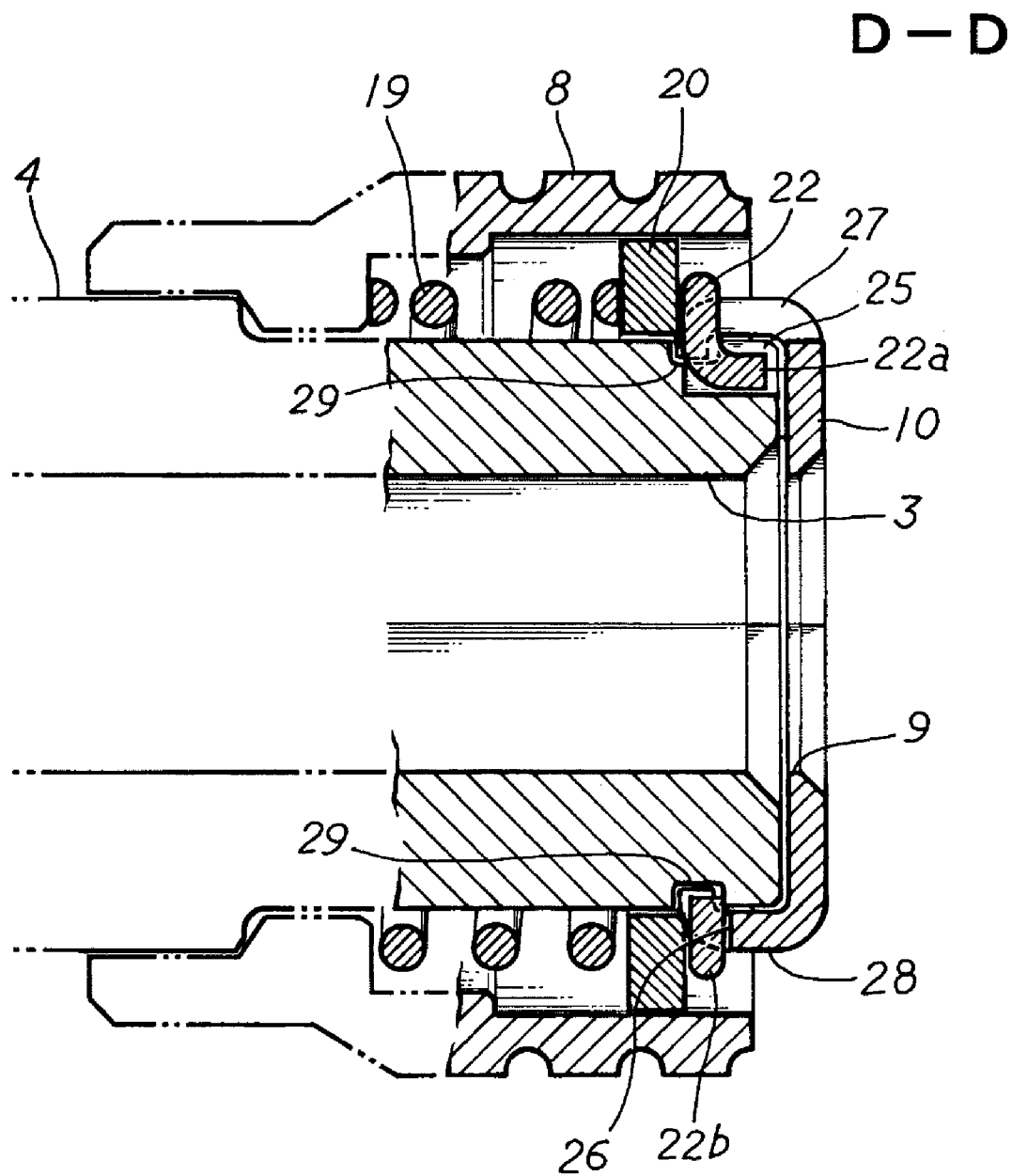
FIG. 16 is an enlarged schematic sectional view (along line D-D in FIG. 13) showing the relevant parts of Example 2.

Specifically, as shown in FIG. 16, a pair of locking tabs 27, 28 for engaging with concave grooves 29 formed in the rotating main shaft 4 is provided to the rotating body 10, and the rotating body 10 is provided to the distal end of the machine tool retaining hole 3 in a state in which the rotating body 10 is twisted (rotationally urged) at a prescribed angle by a substantially C-shaped elastic body 22 in which one end 22a thereof is locked in a groove part 25 provided to the rotating main shaft 4, and the other end 22b is locked in a groove part 26 provided to one of the locking tabs 28 of the rotating body 10.

The insertion passage hole 9 of the rotating body 10, and the machine tool retaining hole 3 of the rotating main shaft 4 have a hexagonal cross-sectional shape that fits with the hexagonal base part 2 of the machine tool 1.

Since the rotating body 10 is twisted a prescribed angle with respect to the machine tool retaining hole 3 as described above, when the base part 2 of the machine tool 1 is passed through the insertion passage hole 9 and inserted in the machine tool retaining hole 3, the rotating body 10 is rotated in the direction in which the elastic body 22 is elongated (i.e., the direction opposite that of the return urging of the elastic body 22), and the insertion passage hole 9 must be aligned with the machine tool retaining hole 3. Consequently, in the state in which the base part 2 of the machine tool 1 is inserted in the machine tool retaining hole 3, the base part 2 of the machine tool 1 is rotationally urged by the internal edge of the insertion passage hole 9, and the base part 2 is twisted and pushed.

Figure 15:
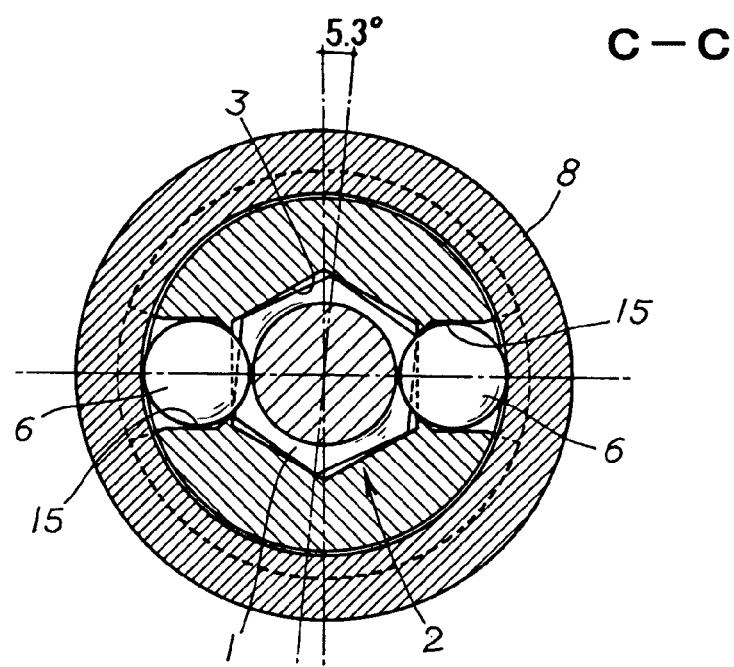
FIG. 15 is a schematic sectional view (along line C-C in FIG. 11) showing Example 2.

In the present example, a configuration is adopted in which the insertion passage hole 9 of the rotating body 10 is offset 10.5° in relation to the machine tool retaining hole 3 (see FIG. 12), and the base part 2 of the machine tool 1 that is rotationally urged by the rotating body 10 is offset 5.3° in relation to the machine tool retaining hole 3 (see FIG. 15).

Figure 10:
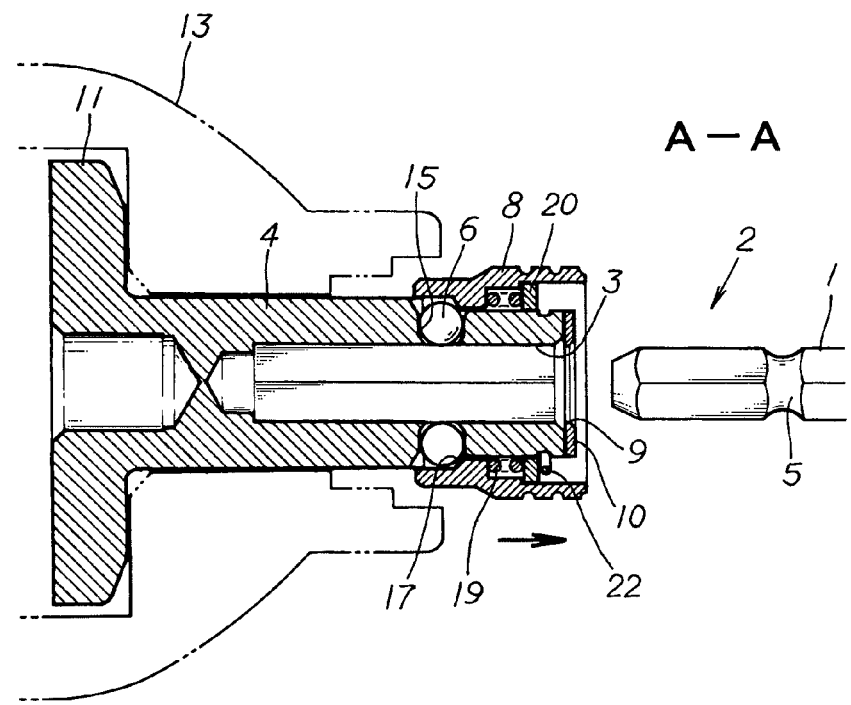
FIG. 10 is a schematic sectional view (along line A-A in FIG. 13) showing Example 2.
Figure 11:
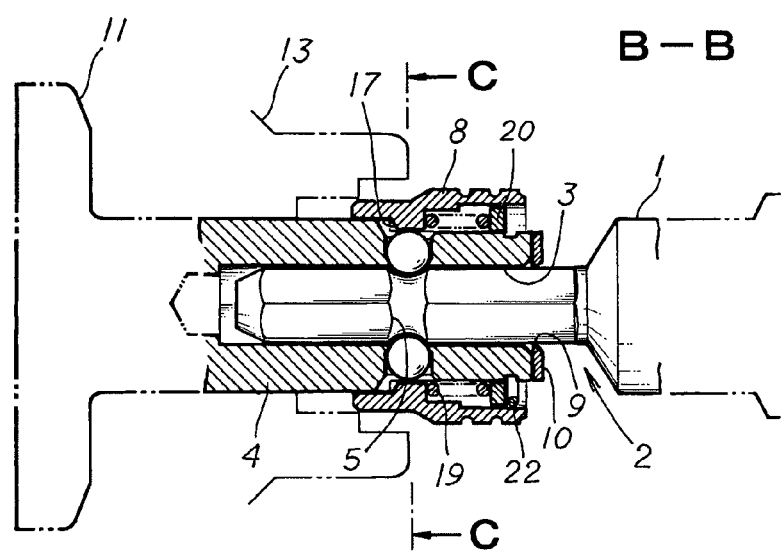
FIG. 11 is a schematic sectional view (along line B-B in FIG. 14) showing Example 2.

Consequently, in the same manner as in Example 1, the sliding tube 8 is pulled towards the distal end of the rotating main shaft 4 as shown in FIG. 10, the locking bodies 6 are retreated in conjunction with the insertion of the machine tool 1, and the base part 2 of the machine tool 1 is placed within the machine tool retaining hole 3 when the base part 2 of the machine tool 1 is inserted in the machine tool retaining hole 3. Pulling of the sliding tube 8 is then stopped, and the sliding tube 8 is urged towards the proximal end, whereby the locking bodies 6 are allowed to protrude inward as shown in FIG. 11, the base part 2 of the machine tool 1 is locked by the locking bodies 6, and the machine tool 1 can be retained in the machine tool retaining hole 3.

Figure 12:
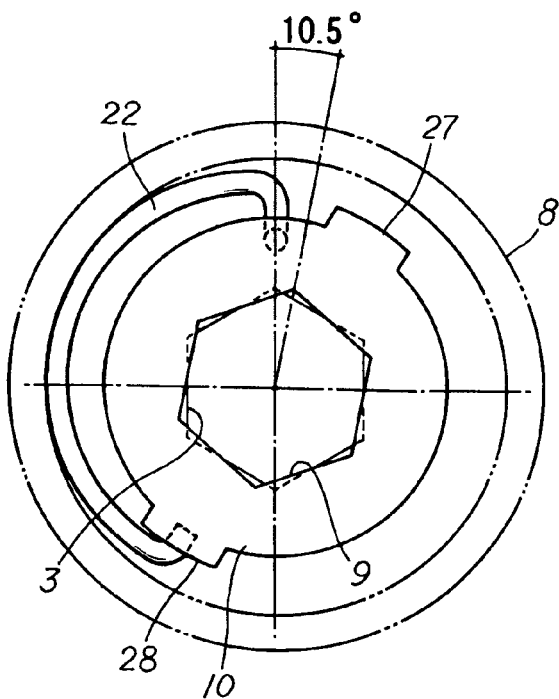
FIG. 12 is a schematic front view showing Example 2.
Figure 13:
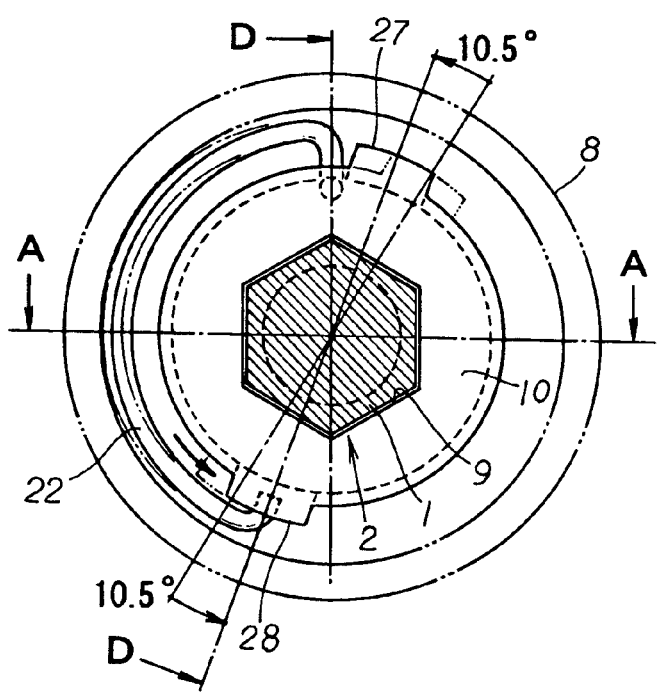
FIG. 13 is a schematic front view showing Example 2.
Figure 14:
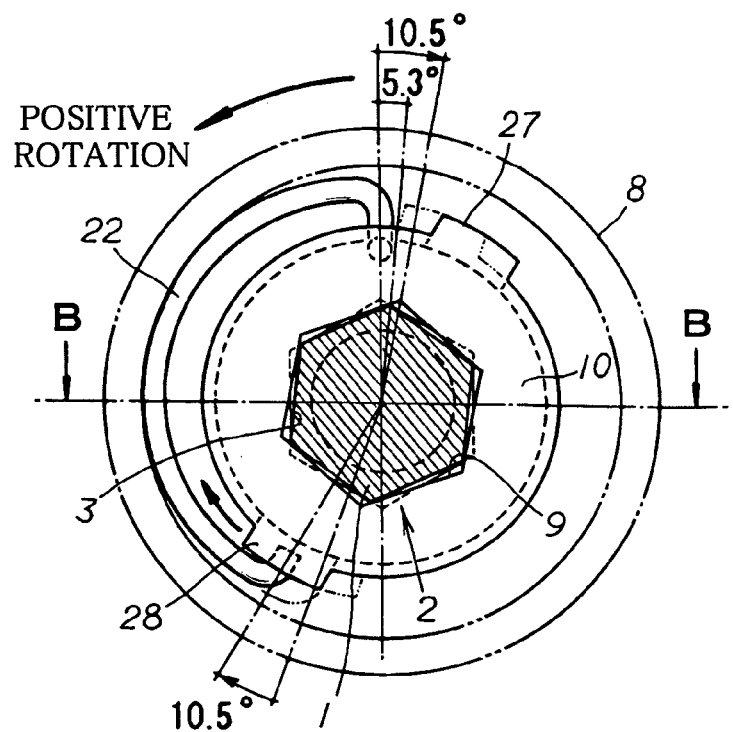
FIG. 14 is a schematic front view showing Example 2.

Furthermore, when the base part 2 of the machine tool 1 is inserted and passed through the insertion passage hole 9 of a rotating body 10 such as the one shown in FIG. 12 and inserted in the machine tool retaining hole 3, the rotating body 10 is rotated by the base part 2 of the machine tool 1 in the direction in which the elastic body is elongated as described above (see FIG. 13), but when insertion of the base part 2 of the machine tool 1 is completed, and the machine tool 1 is no longer held in hand, the base part 2 of the machine tool 1 is twisted and pushed against the internal surface of the machine tool retaining hole 3 by the return urging of the elongated elastic body 22 (see FIG. 14).

Example 2 is thus configured so that the machine tool 1 is twisted and pushed against the internal surface of the machine tool retaining hole 3 by the rotating body 10, the machine tool 1 is held between the rotating body 10 and the internal surface of the machine tool retaining hole 3, and rattling of the machine tool 1 can be prevented at the same time as the operation for retaining the machine tool 1 in the machine tool retaining hole 3 is performed, merely by implementing a simple improvement in an existing rotating tool.

Other effects are the same as in Example 1.

Example 3

Example 3 of the present invention will next be described based on FIGS. 17 through 23.

The rotational urging mechanism of Example 3 differs from the rotational urging mechanism of Example 2 in that an insertion passage hole 9 is not rotated by insertion of the machine tool 1.

Specifically, the sliding tube 8 urged towards the proximal end is fitted in the distal end part of the machine tool retaining hole 3, and an urging force does not act on the rotating body 10 when the sliding tube 8 is pulled towards the distal end against an urging force. The machine tool 1 is thus not rotationally urged in a prescribed direction. In a state in which the sliding tube 8 is moved back by the urging force towards the proximal end, the machine tool 1 is rotated in the prescribed direction, and the machine tool 1 is twisted and pushed against the internal surface of the machine tool retaining hole 3.

Figure 23:
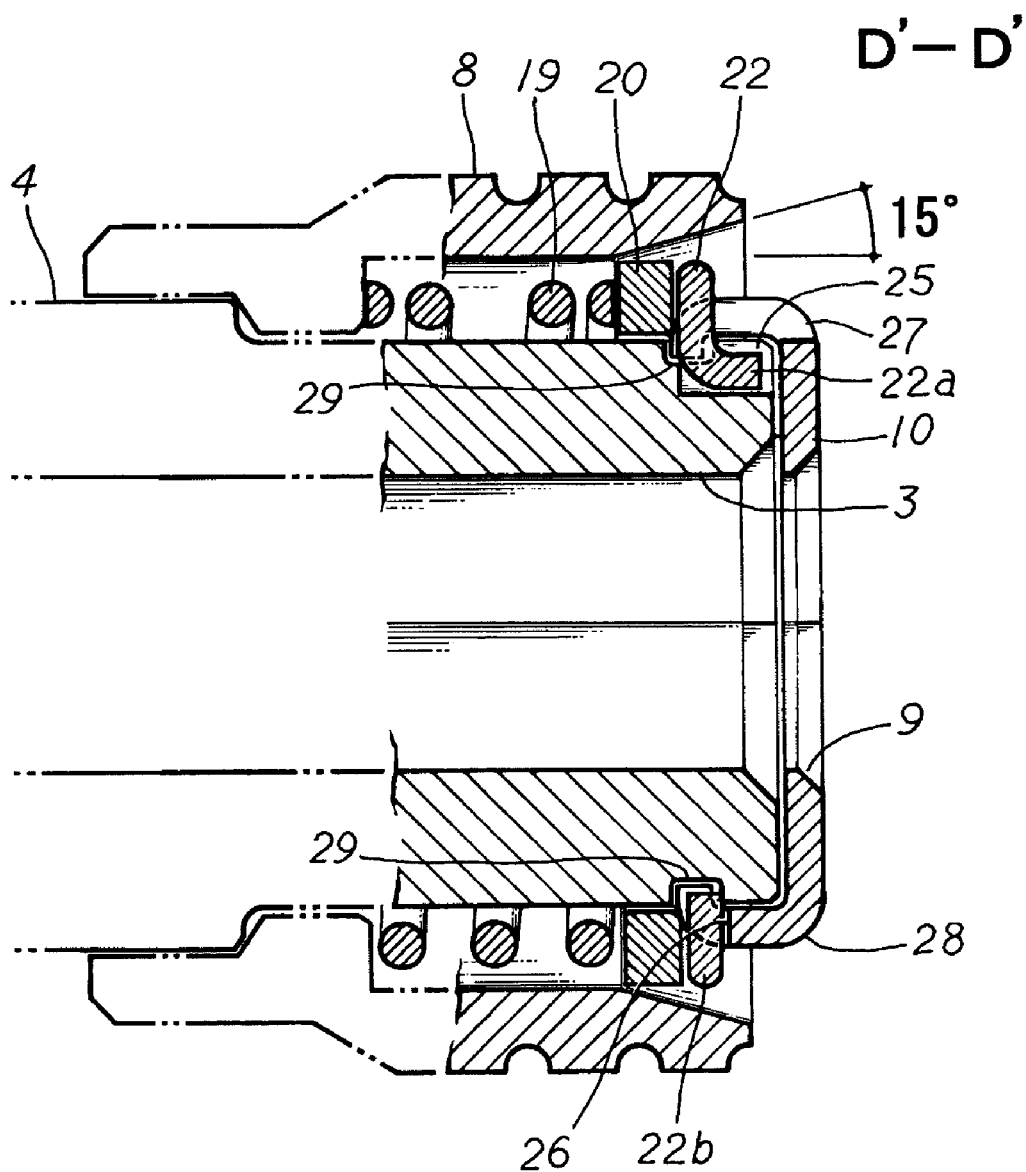
FIG. 23 is an enlarged schematic sectional view (along line D'-D' in FIG. 21) showing the relevant parts of Example 3.

In the same manner as in Example 2, a pair of locking tabs 27, 28 for engaging with concave grooves 29 formed in the rotating main shaft 4 is provided to the rotating body 10 as shown in FIG. 23, and the rotating body 10 is provided to the distal end of the machine tool retaining hole 3 in a state in which the rotating body 10 is twisted (rotationally urged) at a prescribed angle by a substantially C-shaped elastic body 22 in which one end 22a thereof is locked in a groove part 25 provided to the rotating main shaft 4, and the other end 22b is locked in a groove part 26 provided to one of the locking tabs 28 of the rotating body 10.

Figure 17:
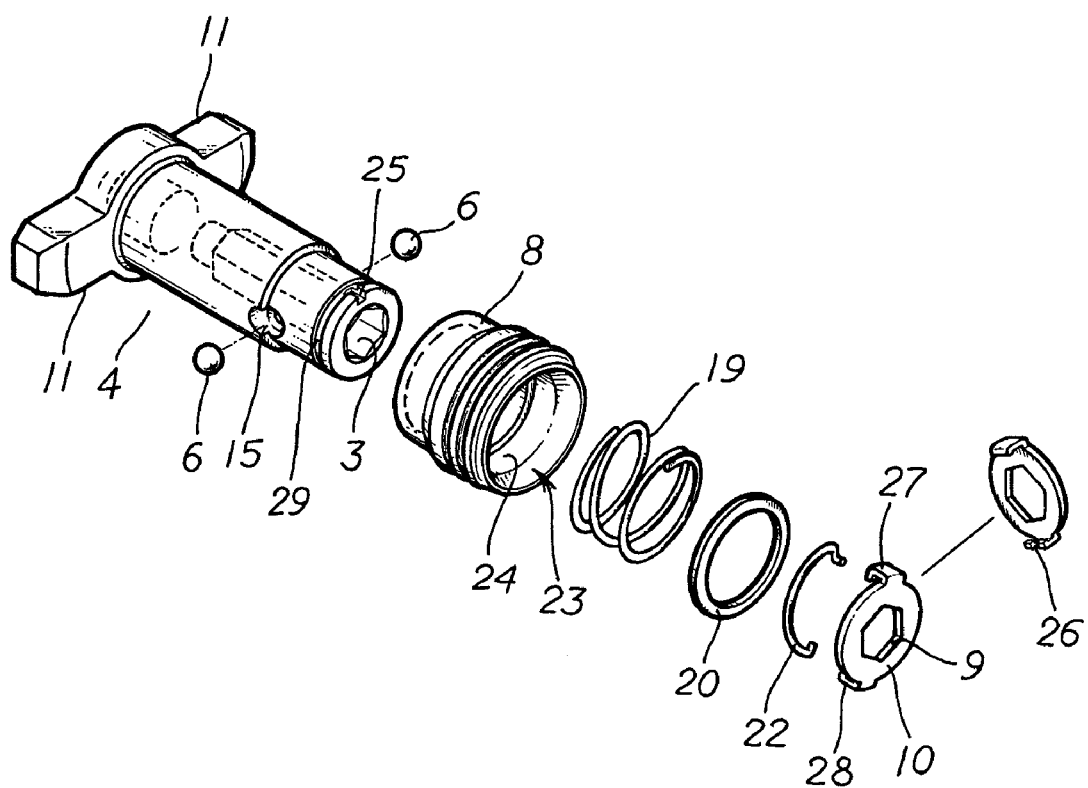
FIG. 17 is a schematic exploded perspective view showing the relevant parts of Example 3.
Figure 18:
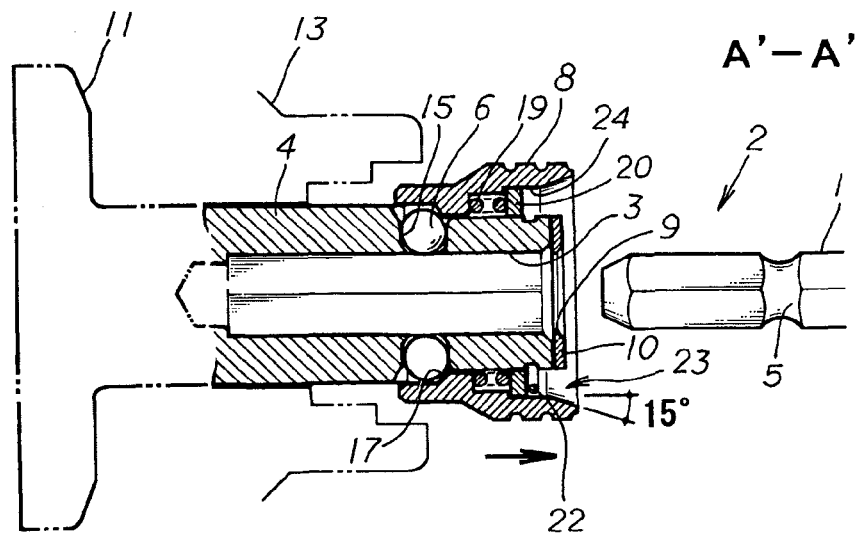
FIG. 18 is a schematic sectional view (along line A'-A' in FIG. 21) showing Example 3.
Figure 19:
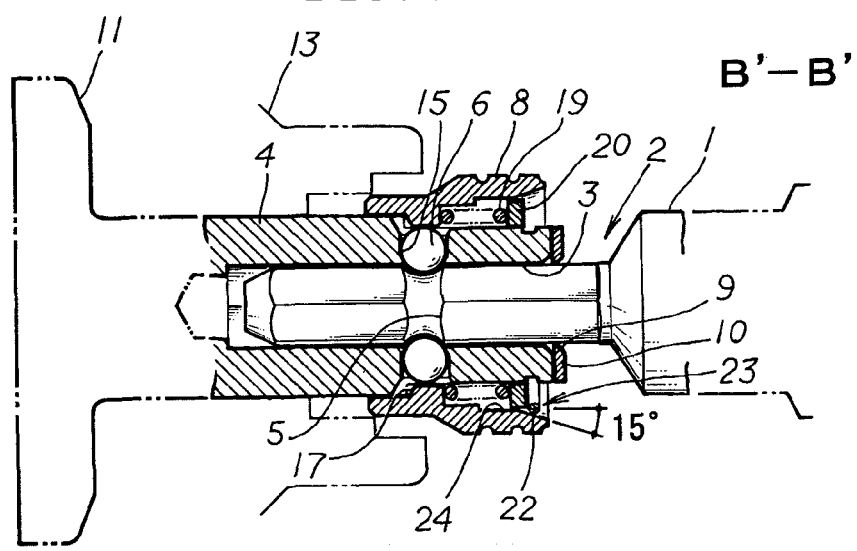
FIG. 19 is a schematic sectional view (along line B'-B' in FIG. 22) showing Example 3.

As shown in FIGS. 17 through 19, a configuration is adopted in Example 3 in which a tapered open part 23 having a diameter that increases towards the distal end, and a small-diameter straight part 24 that is connected with the tapered open part 23 are provided to the internal surface of the distal end part of the sliding tube 8. In a state in which the sliding tube 8 is urged towards the proximal end, the elastic body 22 is positioned in the tapered open part 23 that does not receive external pressure, and in a state in which the sliding tube 8 is pulled towards the distal end, the elastic body 22 is placed in the small-diameter straight part 24 on the proximal end side along the tapered open part 23 of the sliding tube 8.

The elastic body 22 placed in the small-diameter straight part 24 is configured so that the curvature thereof is reduced, and the rotating body 10 is rotationally urged in the elongation direction of the elastic body 22 by a commensurate amount by the pushing of the elastic body 22 inward along the internal surface of the small-diameter straight part 24, and the angle of misalignment of the rotating body 10 in relation to the machine tool retaining hole 3 of the insertion passage hole 9 decreases. Specifically, in Example 3, when the elastic body 22 is positioned in the small-diameter straight part 24, the rotating body 10 is rotationally urged so that the machine tool retaining hole 3 and the insertion passage hole 9 are exactly aligned with each other.

Figure 20:
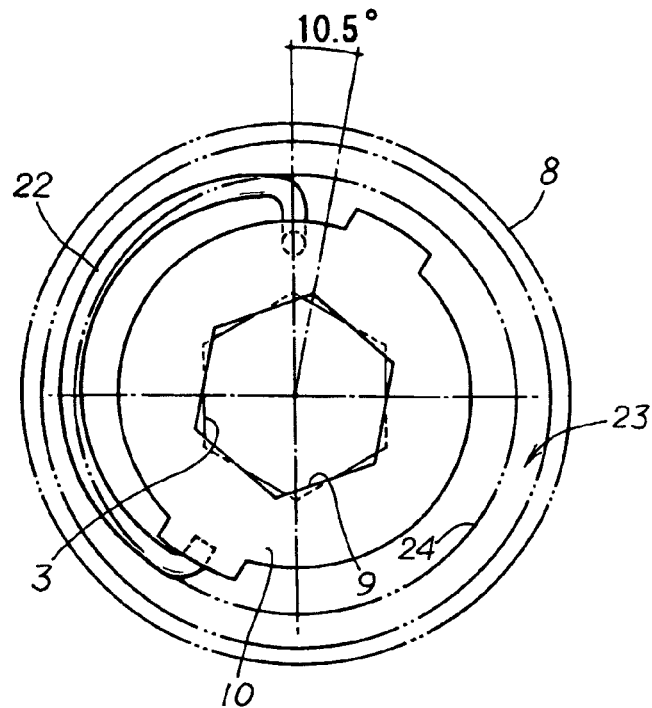
FIG. 20 is a schematic front view showing Example 3.
Figure 21:
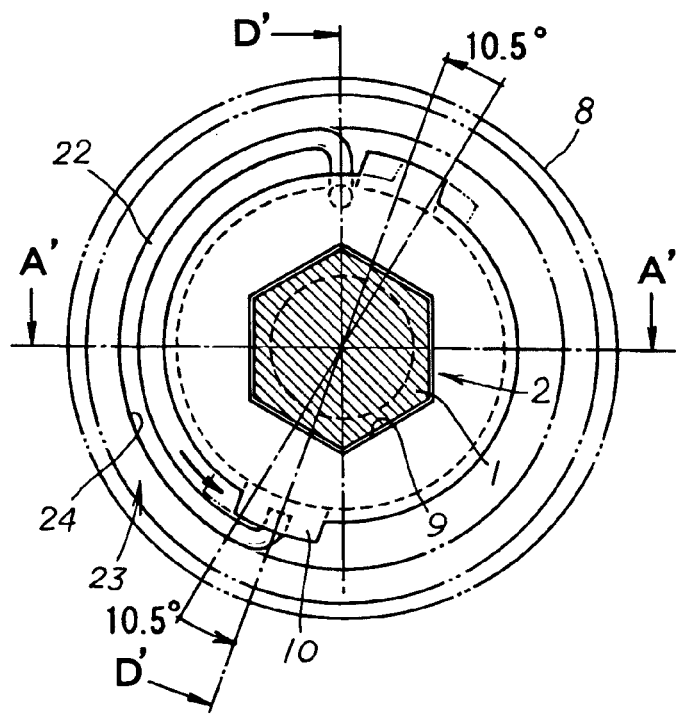
FIG. 21 is a schematic front view showing Example 3.
Figure 22:
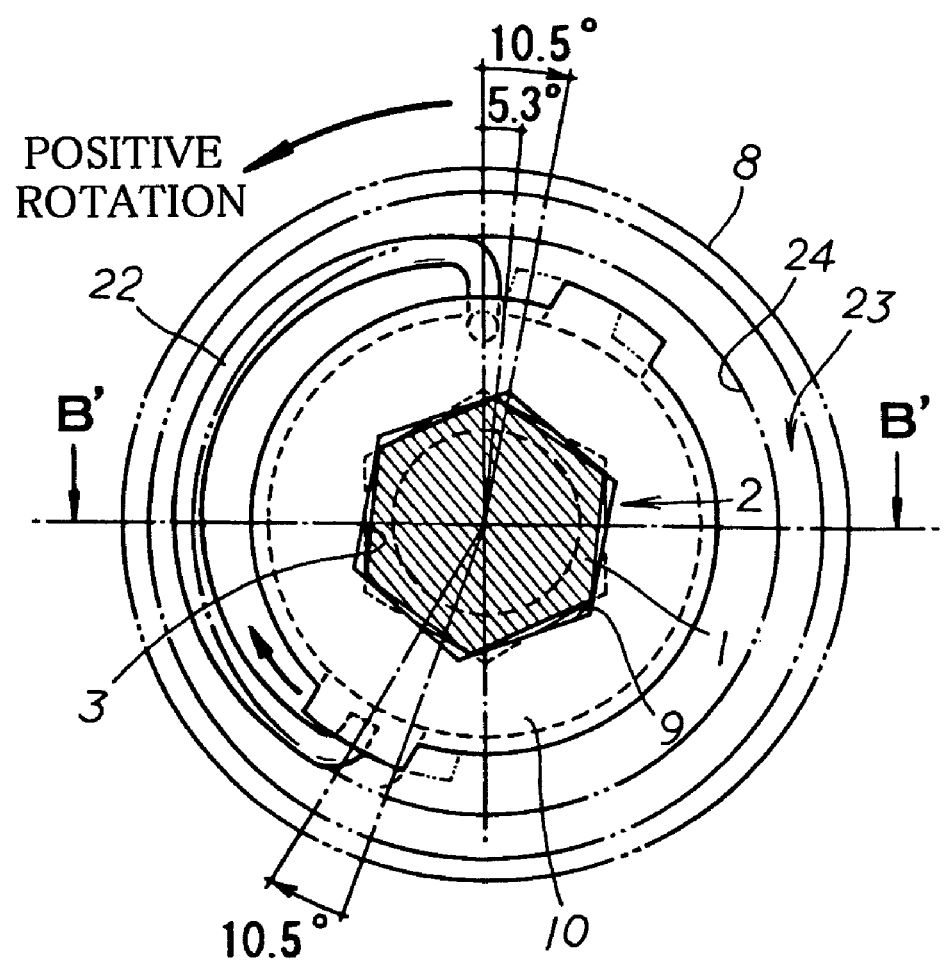
FIG. 22 is a schematic front view showing Example 3.

Accordingly, when the sliding tube 8 is pulled towards the distal end of the rotating main shaft 4 against the urging force as shown in FIG. 18 in order to insert the base part 2 of the machine tool 1 in the machine tool retaining hole 3, the elastic body 22 positioned in the tapered open part 23 of the internal surface of the distal end of the sliding tube 8 as shown in FIG. 20 is placed in the small-diameter straight part 24 on the proximal end side along the tapered open part 23 (see FIG. 21), and is pushed inward by the small-diameter straight part 24. As a result, the elastic body 22 rotationally urges the rotating body 10 in the elongation direction of the elastic body 22, and the machine tool retaining hole 3 and the insertion passage hole 9 are aligned with each other.

When the machine tool 1 is inserted into the aligned insertion passage hole 9 and machine tool retaining hole 3, and the sliding tube 8 is moved back, the elastic body 22 moves from the small-diameter straight part 24 to the tapered open part 23, and is retained in a state of misalignment at a prescribed angle in relation to the machine tool retaining hole 3. The rotating body 10 rotationally urges the base part 2 of the machine tool 1, and the base part 2 of the machine tool 1 is twisted and pushed against the internal surface of the machine tool retaining hole 3.

Specifically, in Example 2, when the machine tool retaining hole 3 and the insertion passage hole 9 of the rotating body 10 are not aligned during insertion of the machine tool 1, and the base part 2 of the machine tool 1 is inserted and passed through the insertion passage hole 9, the rotating body 10 must be slightly twisted and pushed to insert and pass the base part 2 of the machine tool 1 into the machine tool retaining hole 3. However, in Example 3, when the machine tool 1 is smoothly inserted to the machine tool retaining hole 3 (an urging force does not act on the rotating body 10), and the sliding tube 8 is moved back in a state in which the sliding tube 8 is pulled, and the machine tool retaining hole 3 and insertion passage hole 9 are aligned with each other, the base part 2 of the machine tool is twisted and pushed by the urging force, and productivity is correspondingly improved.

Other effects are the same as in Example 2.

The invention claimed is:

1. A rotating tool having a rotating main shaft, in which the rotating main shaft is provided with a machine tool retaining hole having a cross-sectional shape that substantially matches a base part of a driver bit, drill bit, or other machine tool having a polygonal cross-sectional shape that is inserted into the machine tool retaining hole, wherein the rotating tool rotates said machine tool inserted in the machine tool retaining hole by rotating said rotating main shaft and performs work; said rotating tool characterized in that a pushing mechanism is provided for rotating the machine tool with respect to the machine tool retaining hole so that the machine tool is rotationally offset from the machine tool retaining hole as viewed in cross-section while an axial center of the machine tool and an axial center of the machine tool retaining hole are aligned with each other, and for twisting and pushing the machine tool against an internal surface of said machine tool retaining hole when the machine tool is inserted in the machine tool retaining hole.

2. The rotating tool according to claim 1, characterized in that a sliding tube is provided to said machine tool retaining hole; and the sliding tube allows said machine tool to be mounted in said machine tool retaining hole, the pushing mechanism to be operated so as to twist and push the machine tool against the internal surface of the machine tool retaining hole through sliding of the sliding tube.

3. The rotating tool according to claim 2, characterized in that the sliding of said sliding tube is a single sliding movement of the sliding tube.

4. The rotating tool according to claim 1, characterized in that a sliding tube is provided to said machine tool retaining hole; and the sliding tube is configured so that the machine tool is retained in the machine tool retaining hole, said pushing mechanism is operated, the machine tool is rotated in a prescribed direction, and retaining of the machine tool and twisting and pushing of the machine tool against the internal surface of the machine tool retaining hole are accomplished when the sliding tube is slid, said machine tool is inserted into said machine tool retaining hole, and the sliding tube is moved back.

5. The rotating tool according to claim 1, characterized in that a locking groove is provided to a base part of said machine tool; and a locking body for locking in said locking groove is provided to said machine tool retaining hole.

6. The rotating tool according to claim 5, characterized in that said locking body is disposed in the locking groove; and said machine tool is rotated in a prescribed direction by said pushing mechanism.

7. The rotating tool according to any of claims 1 through 6, characterized in that said pushing mechanism is configured so as to twist and push said machine tool against the internal surface of said machine tool retaining hole when an operation is performed for attaching said machine tool, or release the twisting and pushing when an operation is performed for detaching said machine tool.

8. The rotating tool according to claim 7, characterized in that
a sliding tube that is urged toward a proximal end or toward a distal end is fitted to a distal end part of said machine tool retaining hole; and
said pushing mechanism is configured so that the twisting and pushing of said machine tool against the internal surface of said machine tool retaining hole is released by pulling of the sliding tube to the distal end or the proximal end against an urging force, and said machine tool is twisted and pushed against the internal surface of said machine tool retaining hole by a movement of said sliding tube back towards an opposite side by the urging force.

9. The rotating tool according to claim 8, characterized in that said locking body is placed in said locking groove when said machine tool is twisted and pushed against the internal surface of said machine tool retaining hole.

10. The rotating tool according to claim 9, characterized in that
a peripheral wall of said machine tool retaining hole is provided with a protruding/retreating body for protruding from and retreating into the peripheral wall;
said protruding/retreating body is pushed by a base part of the machine tool inserted in said machine tool retaining hole, and can retreat into the peripheral wall of the machine tool retaining hole in a state in which said sliding tube is pulled against an urging force towards a distal end or a proximal end; and
said protruding/retreating body protrudes from the peripheral wall of said machine tool retaining hole, and twists and pushes a base part of said machine tool against the internal surface of said machine tool retaining hole in a state in which said sliding tube is moved back by the urging force towards the opposite side.

11. The rotating tool according to claim 10, characterized in that said protruding/retreating body is provided in a position facing a peripheral wall of said machine tool retaining hole.

12. The rotating tool according to claim 10, characterized in that said protruding/retreating body is a spherical body.

13. The rotating tool according to claim 11, characterized in that said protruding/retreating body is a spherical body.

14. The rotating tool according to claim 1, characterized in that
a rotating body in which an insertion passage hole communicated with said machine tool retaining hole is formed is provided to a distal end part of said machine tool retaining hole; and
the rotating body is provided with a rotational urging mechanism for rotating the insertion passage hole and a machine tool inserted in said machine tool retaining hole in a prescribed direction, and twisting and pushing the machine tool against the internal surface of said machine tool retaining hole.

15. The rotating tool according to claim 14, characterized in that
said insertion passage hole is provided so as to be offset a prescribed angle in relation to said machine tool retaining hole as viewed from the front; and
the insertion passage hole is moved back by a rotational urging force when the insertion passage hole is rotated into alignment with the machine tool retaining hole.

16. The rotating tool according to claim 14, characterized in that a sliding tube that is urged toward a proximal end or toward a distal end is fitted to a distal end part of said machine tool retaining hole; and
said rotational urging mechanism is configured so that said machine tool is not rotationally urged in a prescribed direction in a state in which said sliding tube is pulled to the distal end or the proximal end against an urging force, and said machine tool is rotated in the prescribed direction and twisted and pushed against the internal surface of said machine tool retaining hole in a state in which said sliding tube is moved back towards an opposite side by the urging force.

17. The rotating tool according to any of claims 14 through 16, characterized in that a locking groove is provided to a base part of said machine tool, and a locking body for locking in said locking groove is provided to said machine tool retaining hole.

18. The rotating tool according to claim 17, characterized in that said locking body is disposed in the locking groove; and
said machine tool is rotated in a prescribed direction by said rotational urging mechanism.

19. A rotating tool for rotating a machine tool inserted in a machine tool retaining hole and performing work by rotating a rotating main shaft, wherein the rotating tool has a rotating main shaft; a driver bit, drill bit, or other machine tool is inserted in the rotating main shaft; and a machine tool retaining hole having a cross-sectional shape that substantially matches a polygonal cross-sectional-shaped base part of the machine tool is provided; said rotating tool characterized in that
a pushing mechanism for pushing in a state facing the vicinity of an angled part of said machine tool inserted in said machine tool retaining hole is provided to said rotating main shaft;
the pushing mechanism is configured so as to push in a state facing the vicinity of the angled part of said machine tool and rotate said machine tool, and twist and push the machine tool against an internal surface of said machine tool retaining hole so that the machine tool is rotationally offset from the machine tool retaining hole as viewed in cross-section while an axial center of the machine tool and an axial center of the machine tool retaining hole are aligned with each other;
a locking groove is provided to said base part of said machine tool;
locking bodies for locking in said locking groove and retaining said machine tool are provided to said machine tool retaining hole;
a sliding tube that is urged towards a proximal end or a distal end is provided to said machine tool retaining hole;
retention of the machine tool by said locking bodies is released, and twisting and pushing of said machine tool against the internal surface of said machine tool retaining hole by said pushing mechanism is released when the sliding tube is pulled towards the distal end or the proximal end against an urging force; and
said locking bodies are placed in said locking groove, said machine tool is retained, and the machine tool is twisted and pushed against the internal surface of said machine tool retaining hole by said pushing mechanism when said sliding tube is moved back towards an opposite side by the urging force.

20. A rotating tool for rotating a machine tool inserted in a machine tool retaining hole and performing work by rotating a rotating main shaft, wherein the rotating tool has a rotating main shaft; a driver bit, drill bit, or other machine tool is inserted in the rotating main shaft; and a machine tool retaining hole having a cross-sectional shape that substantially matches a polygonal cross-sectional-shaped base part of the machine tool is provided; said rotating tool characterized in that

- a pushing mechanism for pushing in a state facing the vicinity of an angled part of said machine tool inserted in said machine tool retaining hole is provided to said rotating main shaft;
- the pushing mechanism is configured so as to push in a state facing the vicinity of the angled part of said machine tool and rotate said machine tool, and twist and push the machine tool against an internal surface of said machine tool retaining hole so that the machine tool is rotationally offset from the machine tool retaining hole as viewed in cross-section while an axial center of the machine tool and an axial center of the machine tool retaining hole are aligned with each other;
- a locking groove is provided to said base part of said machine tool;
- locking bodies for locking in said locking groove and retaining said machine tool are provided to said machine tool retaining hole;
- a sliding tube that is urged towards a proximal end or a distal end is provided to said machine tool retaining hole;
- twisting and pushing of said machine tool against the internal surface of said machine tool retaining hole by said pushing mechanism is released when the sliding tube is pulled towards the distal end or the proximal end against an urging force; and
- the machine tool is twisted and pushed against the internal surface of said machine tool retaining hole by said pushing mechanism when said sliding tube is moved back towards an opposite side by the urging force.

* * * * *